Sept. 15, 1970          R. E. BROOKS          3,528,719

MULTIPASS HOLOGRAPHIC INTERFEROMETER

Filed Jan. 26, 1968

Robert E. Brooks,
INVENTOR.

BY

ATTORNEY

United States Patent Office 3,528,719
Patented Sept. 15, 1970

3,528,719
MULTIPASS HOLOGRAPHIC INTERFEROMETER
Robert E. Brooks, Redondo Beach, Calif., assignor to TRW Inc., Redondo Beach., Calif., a corporation of Ohio
Filed Jan. 26, 1968, Ser. No. 700,929
Int. Cl. G02b 27/00
U.S. Cl. 350—3.5                                             10 Claims

ABSTRACT OF THE DISCLOSURE

A holographic interferometer is disclosed which permits to measure small phase differences by causing the subject beam of the interferometer to be reflected repeatedly through the subject. The phase sensitivity is directly dependent on the number of passes which the subject beam makes through the subject. Special means are disclosed for limiting the number of reflections of the subject beam between two mirrors, one of which is partially reflecting. This may be done, for example, by utilizing quasi-monochromatic light having coherence for a predetermined length. Alternatively, the light source, which may be a laser, develops a pulse of predetermined duration. The effective length of the light pulse may be limited by an optical shutter, or finally the subject beam may be slightly tilted so that it initially passes a first aperture in an aperture plate and emerges from a spaced second aperture or alternatively from the first aperture after a predetermined number of reflections.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates generally to light interferometers, and particularly relates to the art of holography.

Holography may be considered to be a branch of optical interferometry. A hologram is made by recording on a light-sensitive medium such as a photographic emulsion an optical interference pattern produced by the interference between a reference beam and a subject beam which has illuminated a subject. The beams are monochromatic light which is coherent. Therefore for practical reasons a hologram is generally made with the light from a laser, where laser is an acronym of "light amplification by stimulated emission of radiation."

A hologram is reproduced by illuminating it again with a beam of monochromatic light. This produces two first orders of diffraction of the originally recorded sets of wavefronts, which may be considered a species of a diffraction grating. The first two orders of diffraction produce a virtual image and a conjugate image corresponding to the original subject. Actually the hologram records both amplitude and phase of the interfering light beams. This amplitude and phase record is then used to reconstruct the original set of wavefronts.

For study of certain phenomena it is important that an interferometer be able to measure small phase differences of the light. This may be important, for example, for studying phenomena which occur in gases at low pressures, such as shock waves, combustion fronts of ignited gas mixtures and the like. Normally the phase sensitivity may be improved by being able to interpolate the interference fringe pattern. Another way of increasing the phase sensitivity is to actually increase the number of fringes and the fringe shift. This may be done, for example, by causing the light beam to pass through the subject many times.

Such multipass arrangements are known in conventional interferometers. However, they have the drawback that high precision optical elements are required. For example, it may be necessary to control the precision of the optical elements within $\frac{1}{100}$ of a wavelength in order to permit 10 passes through the subject. Obviously this makes the optical equipment extremely expensive and limits the size of the lenses and the like which can be used.

It is accordingly an object of the present invention to provide a holographic arrangement for measuring small phase differences.

Another object of the invention is to provide a holographic interferometer which has large tolerance to optical imperfections of the optical elements used in the device.

A further object of the invention is to provide a holographic interferometer of the type discussed where the phase sensitivity is appreciably increased by making the subject light beam pass repeatedly through the subject in such a manner that the number of reflections is limited to a desired value.

SUMMARY OF THE INVENTION

In accordance with the present invention there is provided a multipass interferometer which is particularly suitable for obtaining a hologram with an improved phase sensitivity. This includes a source of coherent monochromatic light. Preferably this is the light from a laser which is sufficiently coherent for the purposes at hand. As is well known, the coherent length of a laser beam may vary from one centimeter for a ruby laser to as much as several kilometers for certain gas lasers. The light from the source is then split by suitable optical means into a reference beam and a subject beam. The two beams are subsequently recombined so that a hologram of the recombined beams may be obtained by means of a suitable light-sensitive medium.

A reference beam path of a first predetermined length is defined by suitable optical means, such, for example, as mirrors. Similarly a subject beam path of a second predetermined length is defined by other optical means. The length of the subject beam path is such that it is long enough compared to the length of the reference beam to permit interference of the two beams after they have been recombined. In other words, if the coherence of the light source is limited, the length of the reference beam and the subject beam after a predetermined number of reflections must be such that the recombined beams are still capable of interfering with each other.

Spaced mirror means are disposed in the subject beam path for causing the subject beam to be reflected repeatedly therebetween. This may, for example, include a partial mirror and a totally reflecting mirror. The subject is disposed within the two spaced mirrors. Finally, means are provided for limiting the number of reflections of the subject beam between the two mirrors to a desired value.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

DESCRIPTION OF THE PREFERRED EMBODIMENTS

Figure 1:
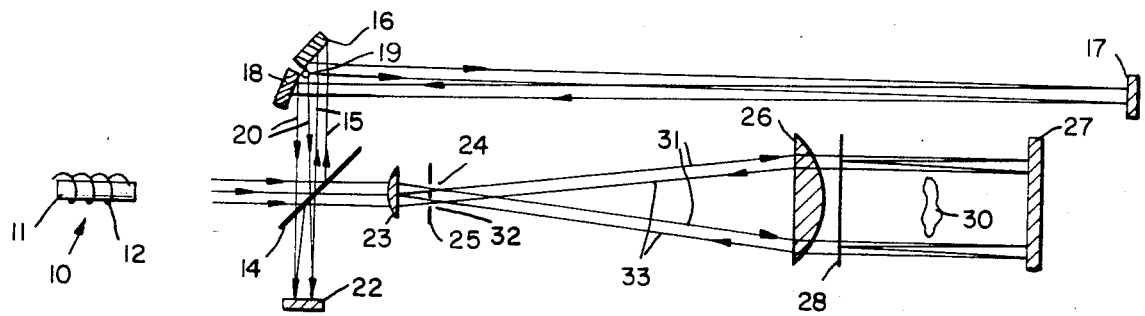
FIG. 1 is a schematic representation of a multipass interferometer in accordance with the present invention and including means for limiting the number of passes through the subject by an aperture plate having two spaced apertures.

Referring now to the drawings, wherein the same elements are designated by the same reference characters, and particularly to FIG. 1, there is illustrated a holographic interferometer embodying the present invention. FIG. 1 illustrates a Twyman-Green interferometer which may be considered a modified Michelson interferometer. The interferometer includes a monochromatic coherent light source 10 which, as shown schematically, may consist of a laser having, for example, a ruby rod 11 and a surrounding flash tube 12 for exciting the atoms of the ruby into an upper level. However, any other laser including gas lasers may be used instead, as well as other conventional monochromatic coherent light sources such as a mercury discharge tube.

The light from the light source 10 falls on a beam splitter 14, which may be a partial mirror as shown so that it will reflect part of the light and transmit the remainder. Accordingly the beam splitter 14 splits the light from the source 10 into a reference beam and a subject beam. Thus the upper portion of the input beam as shown by the light paths 15 may be reflected onto a plane mirror 16 and thence to a second mirror 17 which in turn reflects the light back onto a second plane mirror 18 and, as shown by the light beams 20, back onto the beam splitter 14. Finally the light from the reference beam now passes through the beam splitter 14 onto the hologram 22 which may be any light-sensitive medium such as photographic emulsion, a photoelectric surface or the like.

It should be noted that the two plane mirrors 16 and 18 are independently adjustable as shown by the hinge 19 therebetween. This makes it possible to return the reference beam onto the hologram 22 at a small angle respect to the original reference beam 15. However, the use of a subject and reference beam which meet at a small angle is not essential to the interferometer of the present invention. A small-angle interferometer where the subject and the reference beam form a small angle has been disclosed and claimed in my co-pending patent application entitled "Small-Angle Interferometer," filed concurrently herewith and assigned to the assignee of the present invention.

This arrangement of two separately adjustable plane mirrors 16 and 18 avoids the necessity of utilizing beam-shearing which may otherwise have to be used and which has been disclosed in my above identified co-pending application.

The subject beam passes through the beam splitter 14 and onto a positive lens 23 and through an aperture 24 in an aperture plate 25. Subsequently the light falls onto another positive lens 26 and is projected against a totally reflecting plane mirror 27. A partially reflecting mirror 28 is spaced from the totally reflecting mirror 27 and the subject 30 may be disposed between the two mirrors 27 and 28.

It will be noted that the two positive lenses 23 and 26 may be plano-convex lenses as shown and cause the light beam to be increased in cross section so that the subject 30 may be larger in cross section than that of the original input beam obtained from the source 10.

The subject beam initially passes through or is forced through the aperture 24 as shown by the light beams 31. After a predetermined number of reflections of the subject beam between the two mirrors 27 and 28, the light is made to pass through a second aperture 32 which is spaced from the first aperture 24 a predetermined amount. To this end the two mirrors 27 and 28 are canted slightly with respect to one another so that the subject beam, after each round trip between the two mirrors and after having passed the subject twice, is focused at a slightly different spot on the aperture plate 25. The desired number of passes depends on the angle of the two mirrors 27, 28, the distance between the two apertures 24, 32, and of course the lens 26. It will be realized that after each bounce of the light between the two mirrors 27 and 28, some of the light passes through the partial mirror 28. However, this light is intercepted by the aperture plate 25 until the desired number of traversals have been made, whereupon the subject beam will pass through the aperture 32 as shown by the light beams 33.

It is also feasible to adjust the angle between the two mirrors 27 and 28 in such a manner that the light leaves again through the entrance aperture 24 after a predetermined number of passes. All that is needed is that the light beam after a certain number of passes retraces its path. It will be apparent that in that case the entering light beam 31 will be the same as the light beam 33 that leaves the subject.

The maximum number of passes which may be obtained depends on the refraction of the light by the subject, the physical size of the components and the desired image resolution. For this reason the system is particularly adapted for subjects which have very little phase distortion such as low-pressure gas phenomena. It should also be realized that only a portion of the light of the subject beam emerges through the second aperture 32, and hence a lower light intensity is available for recording as a hologram 22.

Figure 2:
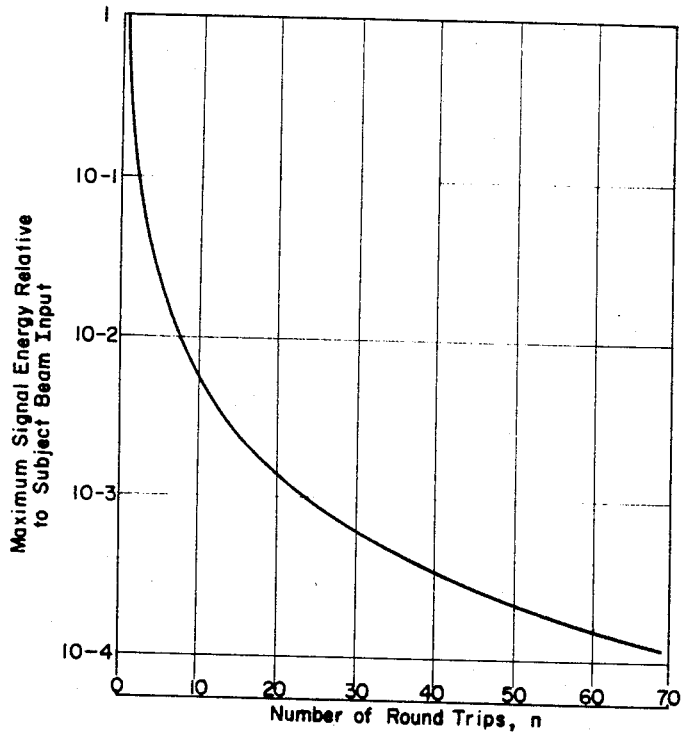
FIG. 2 is a chart illustrating the maximum signal energy compared to the subject beam input energy as a function of the number of round trips or reflections of the subject beam path through an interferometer in accordance with the invention.

The desired number of passes may be determined by means of the chart of FIG. 2, to which reference is now made. Thus if the subject beam makes $n$ round trips between the two mirrors 27 and 28, the light passes through the subject $2n$ times and the phase sensitivity of the system is increased $2n$ times. Assuming that the reflectivity of the partial mirror 28 is $r$, its transmittance is $(1-r)$. Assuming further that the input beam energy of the subject beam which first passes the partial mirror 28 is unity, then the energy $S_n$ which excites the cavity between the two mirrors 27, 28 after the $n$th round trip is as follows:

$$S_n = (1-r)^2 r^{n-1} \quad (1)$$

In order to obtain a maximum, we set the derivative with respect to $r$ equal to zero as follows:

$$\frac{dS_n}{dr} = 0 \quad (2)$$

This now yields the reflectivity $r_n$, which maximizes the energy $S_n$ as follows:

$$r_n = \frac{n-1}{n+1} \quad (3)$$

For this optimum reflectivity the optimum value of $S_n$ is obtained as follows:

$$S_{no} = \left[\frac{2}{n+1}\right]^2 \left[\frac{n-1}{n+1}\right]^{n-1} \quad (4)$$

FIG. 2 plots the result of Formula 4 as a function of $n$. Of course it should be realized that the minimum value of $S_n$ or the maximum number of round trips which still permit reconstruction of the hologram depends on the photographic emulsion that is used as well as on the amount of spatial filtering of the reconstructed image. The photographic emulsion should preferably have low grain noise and high contrast.

Utilizing, for example, a type 649F plate, which has very low scattered light, holographic interferometers have been made using a reference to the subject beam ratio of $10^4$. This corresponds approximately to $S_{no}$ of $2 \times 10^{-4}$ or approximately 50 round trips in the cavity between the two mirrors 27, 28. This in turn yields an increase in sensitivity of 100 times over a single pass interferometer.

The interferometer of FIG. 1 discloses one arrangement in accordance with the present invention for limiting the number of traversals of the subject beam through the subject to a desired value. Thus in FIG. 1 this was accomplished by tilting the subject beam and causing it to pass a second aperture after a predetermined number of reflections. It is also feasible in accordance with the present invention to select the desired number of passes of the subject beam through the subject by using time coincidence between the reference and subject beams. Such an arrangement has been shown in FIG. 3, to which reference is now made.

Figure 3:
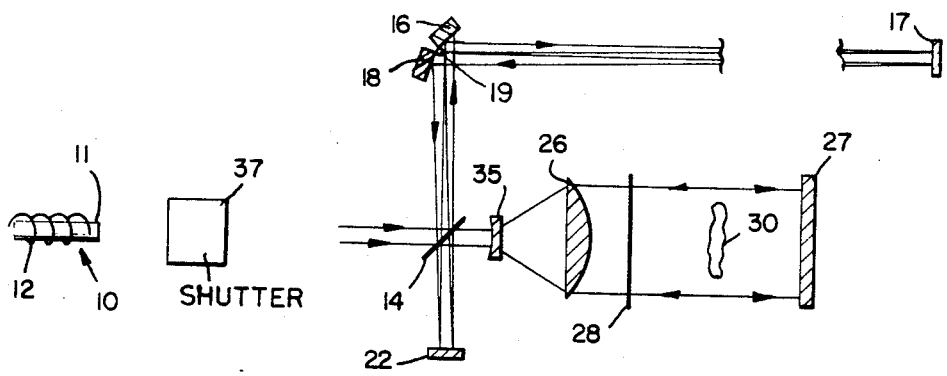
FIG. 3 is a schematic representation of a modified interferometer in accordance with the invention which permits to control the number of reflections of the subject beam by other means.

The interferometer of FIG. 3 is substantially the same as that of FIG. 1 except that the aperture plate 25 has been omitted and that a negative lens 35 may be used in combination with the positive lens 26 for enlarging the subject beam. The negative lens 35 may be a plano-concave lens as shown. Alternatively, a positive lens may also be used such as shown at 23 in FIG. 1.

In order to determine the number of round trips $n$ which the subject beam performs between the two mirrors 27 and 28, the time duration of the laser pulse developed by the light source 10 may be predetermined. This time duration should be less than the round trip cavity delay time $2d/c$, where $d$ is the distance between the two mirrors 27, 28 and $c$ the velocity of light. Accordingly discrete pulses of decreasing amplitude leave the cavity formed by the two mirrors 27, 28 and strike the hologram. Furthermore, the entire length of the reference arm D, that is, the length of the reference beam from mirror 14 to mirrors 16, 17, 18 and back to mirror 14 is D, which is adjusted so that D equals $nd$. In other words, this means that the reference pulse strikes the hologram in time coincidence with the desired subject pulse. Thus the reference pulse interferes only with the light of the subject pulse which has made $n$ round trips through the subject, and accordingly only that particular subject pulse is holographically recorded. Other subject pulses only fog the hologram. Due to the fogging, the resulting hologram has decreased contrast. This results in a reconstructed beam of less light intensity because it must compete with the scattered light from the plate. This effect ultimately limits the maximum number of round trips which may be tolerated before the hologram is of insufficient contrast to make it useful.

Instead of using a laser 10 with a predetermined pulse duration, it is feasible instead to utilize a continuous laser beam with a suitable electronic shutter 37 as shown in FIG. 3. The shutter 37 is interposed between the light source 10 and the beam splitter 14 and may, for example, consist of a Kerr cell with suitable electronics for opening and closing the shutter for the desired time duration to obtain a light pulse of predetermined time duration.

Instead of disposing the shutter 37 between the light source 10 and the beam splitter 14, it may also be positioned just ahead of the hologram plate 22. In other words, the shutter 37 may be disposed between the beam splitter 14 and the hologram 22. In that case the light from the light source 10 should be pulsed either by using a pulsed laser or a continuous laser with a shutter. Alternatively, this may be effected conveniently by utilizing a gated electronic image intensifier tube to take the place of the hologram. Such an image tube may be electronically gated like a shutter. The image obtained from the image tube may then be photographed to record the hologram pattern.

Still another way to predetermine the number of traversals of the subject beam between the two mirrors 27, 28 is to control the length of coherence of the light beam from the light source 10. As pointed out before, the length of coherence varies for different types of lasers between the order of a centimeter and a kilometer. All that is necessary is to make sure that the subject beam and the reference beam when recombined are still coherent. To this end, of course, it is necessary to correlate the length of the reference beam with the time of coherence of the light beam.

Preferably the coherence length of the laser should be shorter than twice the length of the cavity between the two reflecting mirrors.

The arrangements described above in connection with FIGS. 1 and 3 for selecting a fixed number of round trips of the subject beam through the subject create certain difficulties as indicated. These may be overcome by combining several of the arrangements discussed hereinabove. For example, a superior system is obtained by the use of two beams of predetermined coherence length in connection with an electronic shutter such as 37 or with the angle-selecting aperture device disclosed in connection with FIG. 1. It will be quite apparent that this minimizes, for example, the narrow width of the electronic pulse which must otherwise be used with a shutter. It also minimizes fogging of the hologram.

The interferometers of the present invention such as disclosed in FIGS. 1 and 3 may also be used for obtaining double exposure holograms. Such holograms may, for example, be produced as follows: A conventional hologram is first made. Subsequently the same subject, at a later time or at a different condition, is again recorded on the same plate as a second hologram. Accordingly two sets of wavefronts are recorded or two finite fringe patterns. When this double exposed hologram is illuminated with monochromatic light, the reconstructed beam is indicative of the phase differences between the two recorded sets of wavefronts. Accordingly what is seen may be considered a third interference pattern corresponding to the difference in phase of the waves of the two sets of wavefronts which have originally been recorded.

Such a double exposure holographic interferometer may be used, for example, for first recording, say, a cold spark, and thereafter the hot spark to make visible the combustion front of the spark or the like. In a similar manner a subject may be recorded once and subsequently compared with its own recording to permit real-time holographic interferometry.

It will be appreciated that it is not necessary to enlarge the subject beam by lenses 23 and 26 of FIG. 1 or by means of lenses 35, 26 as shown in FIG. 3. Thus it is feasible to use a subject beam having the same cross section as the input beam, assuming, of course, that the cross section of the beam is at least as large as that of the subject. However, as pointed out in my co-pending application previously referred to, there are certain advantages to be obtained by increasing the cross section of the subject beam and decreasing it again before the subject beam is recombined with the reference beam. This permits to use in general smaller size optical components and permits higher light intensity on the hologram.

There has thus been disclosed a multipass interferometer which is particularly suitable for holographic purposes. The interferometer of the invention makes use of the fact that for many holographic purposes the quality of the optical components is not important as is the case with conventional systems. Accordingly, relatively low quality components may be tolerated. Furthermore, the number of passes of the subject beam through the subject area may be predetermined by various means such as the time duration of the pulse, the coherence length of the pulse, or by tilting the subject beam so that it makes a predetermined number of traversals before passing through an aperture. Accordingly this makes it possible to obtain holograms with relatively inexpensive equipment and with great phase sensitivity.

What is claimed is:

1. A multipass interferometer of the Twyman-Green type for obtaining a hologram with improved phase sensitivity comprising:
   (a) a source of coherent monochromatic light;
   (b) a beam splitter disposed in the path of the light from said source for splitting said light into a reference beam and a subject beam and for subsequently recombining said reference beam and at least portions of said subject beam;
   (c) a light-responsive recording medium for recording a hologram, said recording medium being disposed in a predetermined plane for recording light that has been recombined by said beam splitter;
   (d) a partially reflecting mirror and a totally reflecting mirror spaced from each other and disposed in the path of said subject beam for reflecting said subject beam repeatedly therebetween, a subject adapted to be disposed within said spaced mirrors, said mirrors being oriented so that a minor portion of said subject beam is directed back to said beam splitter and then to said recording medium for each impingement of the remaining major portion of said subject beam on said partially reflecting mirror;
   (e) optical means disposed in the path of said reference beam for directing said reference beam back through said beam splitter and onto said recording medium along an axis angularly displaced with respect to the axis of each portion of said subject beam at said recording medium; and
   (f) means for limiting the interference of the light at said recording medium to interference between said reference beam and a single, particular minor portion of said subject beam resulting from a particular pass of said subject beam through the subject.

2. An interferometer as defined in claim 1 wherein said means for limiting the interference of the light includes means associated with said light source for developing a light pulse having a duration less than two times the transit time of said subject beam between said mirrors, and wherein the path length of said reference beam is such that said reference beam arrives at said recording medium in time coincidence with said particular minor portion of said subject beam, whereby interference is limited by time coincidence between said reference beam and said particular minor portion of said subject beam.

3. An interferometer as defined in claim 2 wherein said means associated with said light source includes an electronic shutter provided between said light source and said recording medium.

4. An interferometer as defined in claim 2 wherein said means associated with said light source includes an electronic shutter disposed between said light source and said beam splitter, thereby to limit the time duration of the light developed by said source.

5. An interferometer as defined in claim 2 wherein said means associated with said light source includes a gated image intensifier tube provided between said light source and said recording medium.

6. An interferometer as defined in claim 1 wherein said means for limiting the interference includes means coupled with said light source to limit the coherence length of said light emitted by said light source to no longer than twice the path length of said subject beam between said mirrors, and wherein the path length of said reference beam is substantially equal to the path length of said particular minor portion of said subject beam so as to cause interference between said reference beam and said particular minor portion of said subject beam at said recording medium.

7. An interferometer as defined in claim 1 wherein said means for limiting the interference includes a plate disposed in the path of said subject beam between said mirrors and said beam splitter, said plate having a first and a second aperture therein, said apertures being spaced from each other, and a lens system disposed in the path of said subject beam between said beam splitter and said mirrors, said lens system focusing said subject beam initially through the first aperture in said plate, said mirrors being inclined with respect to each other at such an angle as to cause said particular minor portion of said subject beam to be focused by said lens system through said second aperture, and said reference beam having such a path length as to cause interference with said particular minor portion of said subject beam at said medium.

8. An interferometer as claimed in claim 1 wherein a lens system is disposed in the path of said subject beam between said beam splitter and said mirrors for enlarging the cross section of said subject beam before it enters the space defined by said mirrors and for subsequently reducing the cross section of each of said minor portions of said subject beam before it is recombined by said beam splitter.

9. A multipass interferometer of the Twyman-Green type for obtaining a hologram with improved phase sensitivity comprising:
   (a) a source of coherent monochromatic light having a predetermined coherence length;
   (b) a beam splitter disposed in the path of the light from said source for splitting said light into a reference beam and a subject beam and for subsequently recombining said reference beam and at least portions of said subject beam, the path length during which said reference beam and said portions of said subject beam are capable of interference being limited by said coherence length;
   (c) a light-responsive recording medium for recording a hologram, said recording medium being disposed in a predetermined plane for recording light that has been recombined by said beam splitter;
   (d) a partially reflecting mirror and a totally reflecting mirror spaced from each other and disposed in the path of said subject beam for reflecting said subject beam repeatedly therebetween, said mirrors being inclined with respect to each other, a subject adapted to be disposed between said spaced mirrors, whereby a minor portion of the subject beam is directed back to said beam splitter and then to said recording medium for each impingement of the remaining major portion of the subject beam on said partially reflecting mirror;
   (e) optical means disposed in the path of said reference beam for directing said reference beam back through said beam splitter and onto said recording medium along an axis angularly displaced with respect to the axis of each portion of said subject beam at said recording medium;
   (f) a lens system disposed in the path of said subject beam between said beam splitter and said mirrors, said lens system having an intermediate image plane; and
   (g) an aperture plate disposed in said image plane and having two spaced apertures therein, said subject beam being initially focused by said lens system through one of said apertures and being focused through said second aperture after a predetermined number of reflections of said subject beam between said mirrors to permit a selected, particular minor portion of said subject beam to interfere with said reference beam at said recording medium, whereby a hologram of said selected particular minor portion of said subject beam with said reference beam is obtained.

10. An interferometer as defined in claim 9 wherein said lens system is so constructed as to enlarge the cross section of said subject beam before it enters the space defined by said mirrors and to subsequently reduce the cross section of each of said minor portions of said subject beam before it is recombined by said beam splitter.

References Cited

FOREIGN PATENTS 37,026  4/1965  Germany.

OTHER REFERENCES

Brooks et al., IEEE Jour. of Quantum Electronics, vol. QE-2, No. 8, August 1966, pp. 275–279.

Langenbeck, Applied Optics, vol. 6, No. 8, August 1967, pp. 1425–1426.

DAVID SCHONBERG, Primary Examiner

R. J. STERN, Assistant Examiner

U.S. Cl. X.R.

356—106, 112